Jan. 12, 1971  C. S. GELLE  3,554,610
SILAGE DISTRIBUTOR
Filed Sept. 11, 1968
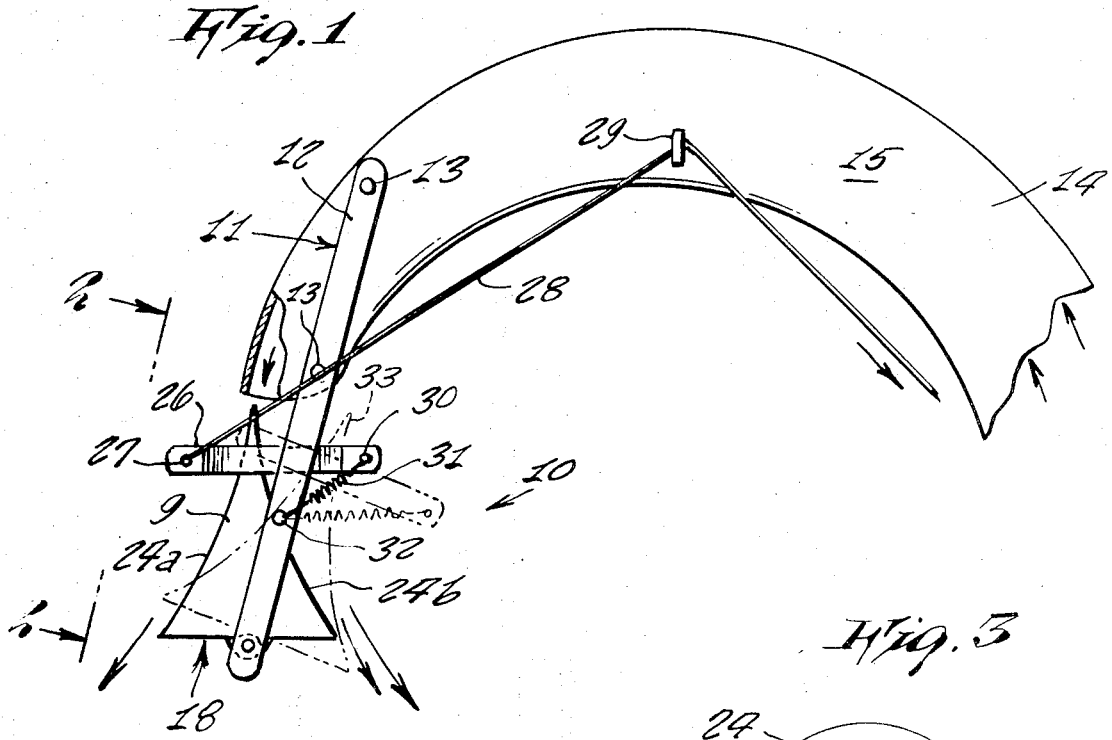
INVENTOR
CECIL S. GELLE

United States Patent Office 3,554,610
Patented Jan. 12, 1971

3,554,610
SILAGE DISTRIBUTOR
Cecil S. Gelle, Rte. 1, Grasston, Minn. 55030
Filed Sept. 11, 1968, Ser. No. 758,980
Int. Cl. B65g *53/40*
U.S. Cl. 302—60
1 Claim

ABSTRACT OF THE DISCLOSURE

An improved distributor for silage into a silo, the device comprising a pivotable deflector which serves as a silage spreader, the deflector being controlled by a rope extending to a person upon the ground, the deflector intercepting the stream of silage being blown out of a discharge pipe into the silo.

---

This invention relates generally to silage spreading devices.

A principal object of the present invention is to provide an improved silage distributor which permits selective control in the placing and positioning of silage within a silo so as to eliminate the possibility of air pockets being formed which would cause the silage to become spoiled.

Another object of the present invention is to provide a silage distributor which is mountable upon the discharge pipe of a silage conveyor.

Yet another object of the present invention is to provide a silage distributor which can be selectively controlled by a workman upon the ground.

Yet a further object of the present invention is to provide a silage distributor having a working surface that is convex and which will accordingly spread the silage in a round pattern.

Other objects of the present invention are to provide a silage distributor which is simple in design, inexpensive to manufacture, rugged in construction, easy to use and efficient in operation.

These and other objects will be readily evident upon a study of the following specification and the accompanying drawing wherein:

FIG. 1 is a side elevation view of the present invention shown mounted upon a blower discharge pipe;

FIG. 2 is an end elevation view as viewed on line 2—2 of FIG. 1;

FIG. 3 is a top plan view of the silage distributor as viewed along line 3—3 of FIG. 2; and FIG. 4 is a bottom plan view thereof.

Referring now to the drawing in detail, the reference numeral 10 represents a silage distributor according to the present invention wherein there is a mounting frame 11 comprised of a pair of spaced apart bars 12 which are secured by means of bolts 13 to opposite side walls 14 of a blower discharge pipe 15. The frame further includes a transverse extending rod 16 secured across the lower ends of the bars 12 and being locked in position by means of cotter pins 17.

A deflector unit 18 includes an upwardly tapered deflector 19 having a circular lower edge 20 which is indented upon opposite sides by notches 21. A transverse sleeve 22 is extended across a bottom wall 23 of the deflector, and secured thereto, the sleeve extending across the notches 21, the sleeve receiving the rod 16 therethrough as shown in FIGS. 2 and 4 of the drawing. Thus the lower end of the deflector is pivotable about the rod 16. The deflector also includes opposite, upwardly converging side walls 24 each wall being of concave configuration, the upper edges of the walls defining a horizontal, linear edge 25.

An arm 26 is secured at its approximate intermediate portion to a side of the deflector in a rigid manner, one end of the arm having an opening 27 for receiving one end of a rope 28 extending through an eye bolt 29 secured upon aide of the blower discharge pipe 15, the opposite end of the rope leading toward the ground where a workman may conveniently manipulate the same. The opposite end of the arm 26 has an opening 30 receiving one end of a tension coil spring 31, the opposite end of the coil spring being secured to a pin 32 mounted upon one of the bars 12. When a workman upon the ground pulls on the rope 28, he will cause the deflector 19 to pivot about the rod 16 causing the apex 33 at the top of the deflector 19 and defined by the straight edge 25 to be moved into the direction as indicated by the phantom lines of FIG. 1, thereby causing silage from the blower discharge pipe to be discharged against the concave side 24a thus causing the silage to be thrown toward the left. When the man releases the rope 28 the tension spring 31 will cause the deflector to be pivoted to the position indicated by the solid lines in FIG. 1, thus causing the silage from the blower discharge pipe 15 to be deflected against the concave side 24b thus causing the silage to be thrown toward the right. Thus an improved means is then provided for the distribution of silage within a silo.

While various changes may be made in the detailed construction, it is understood that such changes will be within the spirit and scope of the present invention as is defined by the appended claim.

I claim:

1. In a silage distributor, the combination of an assembly mounted upon the end of a blower discharge pipe, said assembly comprising a mounting frame and a deflector unit pivotably mounted upon said mounting frame, said mounting frame comprising a pair of spaced apart bars secured to opposite side walls of said blower discharge pipe, said bars being interconnected at their lower ends by means of a transverse rod about which said deflector unit is pivotable, said deflector unit comprising a conical deflector having a circular lower edge interrupted on opposite sides by notches, a bottom side of said deflector having a transverse extending sleeve rigidly secured thereto and extending across said notches, said sleeve receiving said mounting frame rod therethrough, said deflector including opposite side walls extending convergingly upward toward an apex, said side walls being of concave configuration and terminating at their said apex in a straight edge, an arm rigidly secured to a side of said deflector, one end of said arm having an opening to which said one end of a rope is secured, the opposite end of said arm having an opening receiving one end of a tension coil spring, the opposite end of said tension coil spring being secured to a pin mounted upon one of said mounting frame bars so as to return said deflector pivotably in a direction which is opposite to a direction said deflector moves when said rope is pulled, and said rope being passed through an eye bolt secured to a side of said blower discharge pipe, and the terminal end of said rope extending downwardly toward the ground.

References Cited
UNITED STATES PATENTS

| | | | |
|---|---|---|---|
| 714,996 | 12/1902 | Bates | 302—61 |
| 2,209,842 | 7/1940 | Murray | 302—60 |

ANDRES H. NIELSEN, Primary Examiner

U.S. Cl. X.R.
302—61